UNITED STATES PATENT OFFICE.

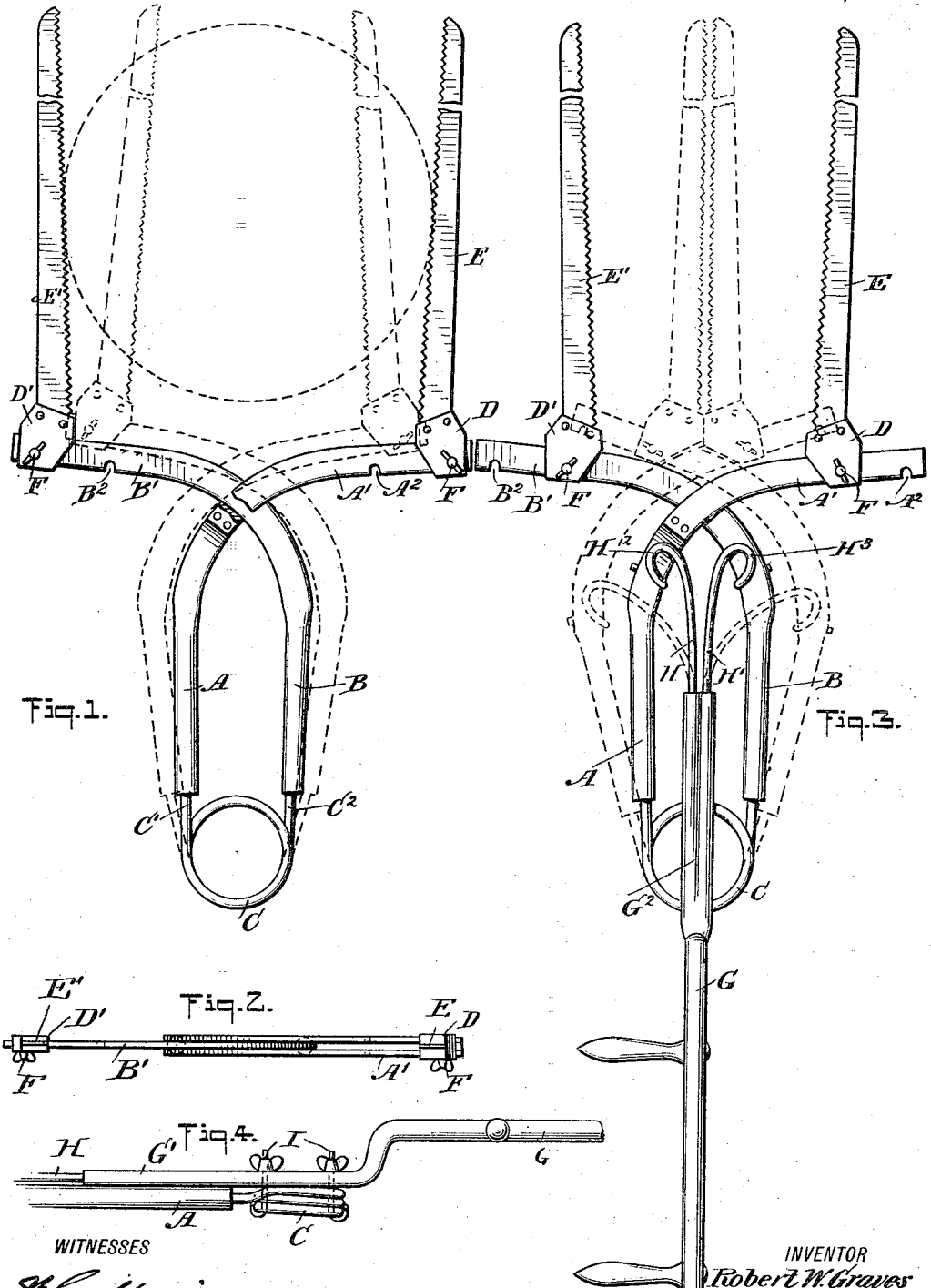

ROBERT WESLEY GRAVES, OF ELIZABETH, NEW JERSEY.

CROSSCUT-SAW.

1,127,883.　　　　Specification of Letters Patent.　　Patented Feb. 9, 1915.

Application filed March 6, 1914.　Serial No. 822,947.

*To all whom it may concern:*

Be it known that I, ROBERT W. GRAVES, a citizen of Canada, and a resident of Elizabeth, in the county of Union and State of New Jersey, have invented a new and Improved Crosscut-Saw, of which the following is a full, clear, and exact description.

The object of the invention is to provide a new and improved crosscut saw more especially designed for cross-cutting purposes such as felling trees, sawing felled trees into the desired length, sawing lumber and the like, and arranged to allow convenient and quick adjustment of the saw blades for sawing work of different diameters, to cut the work by two blades from opposite sides and to hold the saw blades with the desired tension in engagement with the work without pressure on the part of the operator. In order to accomplish the desired result, use is made of a pair of spring-pressed crossed handles provided with adjustable heads carrying saw blades having their teeth opposite each other to cut into the work toward each other from opposite sides.

A practical embodiment of the invention is represented in the accompanying drawings forming a part of this specification, in which similar characters of reference indicate corresponding parts in all the views.

Figure 1 is a plan view of the crosscut saw; Fig. 2 is a front edge view of the same; Fig. 3 is a plan view of the crosscut saw provided with an auxiliary handle; and Fig. 4 is a side elevation of the same.

A pair of handles A and B are attached at their rear ends to the straight terminals C', C² of a coil spring C to swing the handles A and B normally outward away from each other. The handles A and B are provided with sidewise extending ends A', B' crossing one the other, so that the said ends move toward each other by the action of the spring C on the handles A and B. On the ends A', B' are adjustably secured heads D, D' provided with saw blades E and E' having their teeth extending toward each other so as to cut into a tree, log, lumber or other material from opposite sides, as plainly indicated in Fig. 1. The heads D and D' are adjustably secured to the ends A', B' by the use of bolts F passing through the said heads and engaging notches A², B² arranged on the ends A' and B' of the handles A and B. By the arrangement described the heads D and D' can be set nearer toward each other or farther from each other to correspondingly hold the saw blades E and E' apart when sawing materials of different diameters. The end A' is preferably in the form of a fork forming a guide for the end A' so that the saw blades are held in proper alinement with a view to cause the two kerfs cut by the saw blades to meet at the center of the log or other material operated on.

In using the saw, the operator takes hold of the handles A and B and presses the same toward each other with a view to cause the saw blades E, E' to move outward away from each other with a view to engage the teeth of the two saw blades with the log or other material at opposite sides thereof, as indicated in Fig. 1. The operator then releases the pressure on the handles to allow the spring to force the teeth of the saw blades E and E' into engagement with the log, tree or other material, and then the operator simply draws the saw forward and backward in the usual manner to cause the saw blades to cut into the material from opposite sides thereof.

In felling trees it is desirable to cut the tree as close to the ground as possible, and in order to do so conveniently use is made of an auxiliary handle G (see Figs. 3 and 4) provided at its forward end with springs H and H' terminating in hooks H², H³ engaging the handles A and B to yield with the same. The handle G is also provided with spaced hook bolts I hooking onto the coil spring C so as to securely fasten the handle diametrically to the coil spring C, as will be readily understood by reference to the drawings. The forward portion G' of the handle G is preferably offset, as plainly indicated in Fig. 4, to enable the user to take hold of the handle G a desired distance above the ground for conveniently sawing the tree close to the ground.

The crosscut saw shown and described is very simple in construction and can be readily manipulated with a view to quickly cut a tree, log or other material to be sawed.

Having thus described my invention, I claim as new and desire to secure by Letters Patent:

1. A crosscut saw, comprising a pair of handles having sidewise extending outer crossed ends, a coil spring having its terminals connected with the rear ends of the said handles to swing the free outer ends of the handles toward each other, heads mounted to slide on the said free ends of the said handles, means for adjustably fastening the said heads in place and saw blades attached to the said heads.

2. A crosscut saw, comprising a pair of handles having outer crossed ends, a coil spring having straight terminals attached to the rear ends of the said handles to swing the said outer free ends of the said handles toward each other, the said free ends having spaced notches, heads held to slide on the said free handle ends, saw blades attached to the said heads and having their teeth extending toward each other, and bolts engaging the said heads and the said notches to adjustably fasten the said heads in place on the outer ends of the handles.

3. A crosscut saw, comprising a pair of crossed handles, a coil spring having its terminals connected with the rear ends of the said handles to swing the free outer ends of the handles toward each other, heads held on the said free ends of the said handles, saw blades attached to the said heads, an auxiliary handle having spring arms detachably engaging the said handles, and hook bolts on the said auxiliary handle removably engaging said coil spring.

4. A crosscut saw, comprising a pair of handles having outer crossed ends, a coil spring having straight terminals attached to the other ends of said handles to swing the free outer ends of the handles toward each other, heads adjustable on the outer ends of the handles toward and from each other, saw blades carried by the said heads, and means for fastening the heads in adjusted position.

5. A crosscut saw, comprising a pair of spring pressed handles having crossed ends extending sidewise in opposite directions, the end of one of said handles being in the form of a fork through which the end of the other handle is guided, and saws held on the free ends of the said handles.

6. A crosscut saw, comprising a pair of handles having outer crossed ends extending in opposite directions and having guided movement one upon the other, a coil spring having straight terminals attached to the other ends of the handles to swing the free outer ends of the handles toward each other, heads on the outer ends of the handles and adjustable toward and from each other, and saw blades carried by the said heads.

In testimony whereof I have signed my name to this specification in the presence of two subscribing witnesses.

ROBERT WESLEY GRAVES. [L. s.]

Witnesses:
RICHARD F. HOPWOOD,
GERALD O. MEYER.

Copies of this patent may be obtained for five cents each, by addressing the "Commissioner of Patents, Washington, D. C."